W. J. MARTIN.
FIFTH WHEEL.
APPLICATION FILED JAN. 7, 1911.
988,884.
Patented Apr. 4, 1911.
2 SHEETS—SHEET 2.
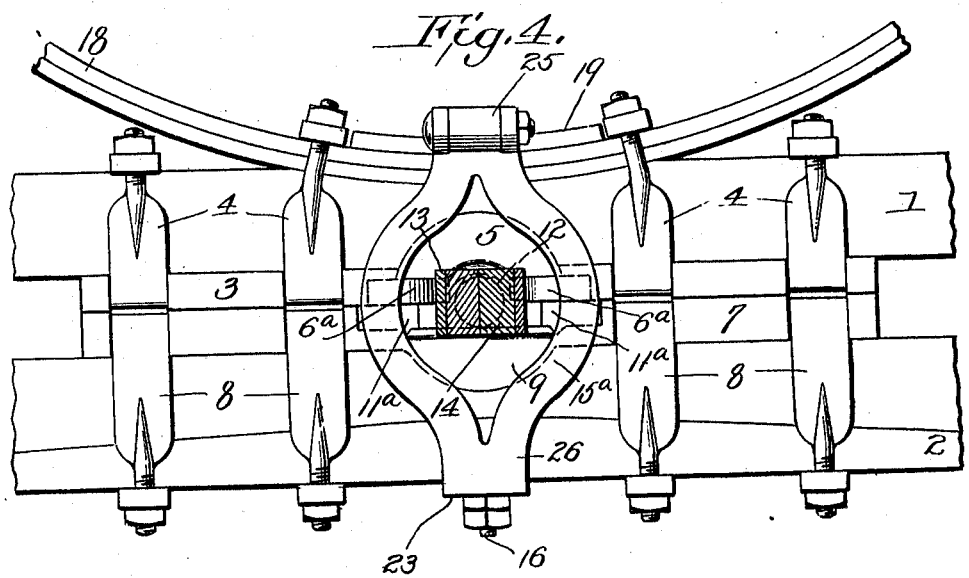
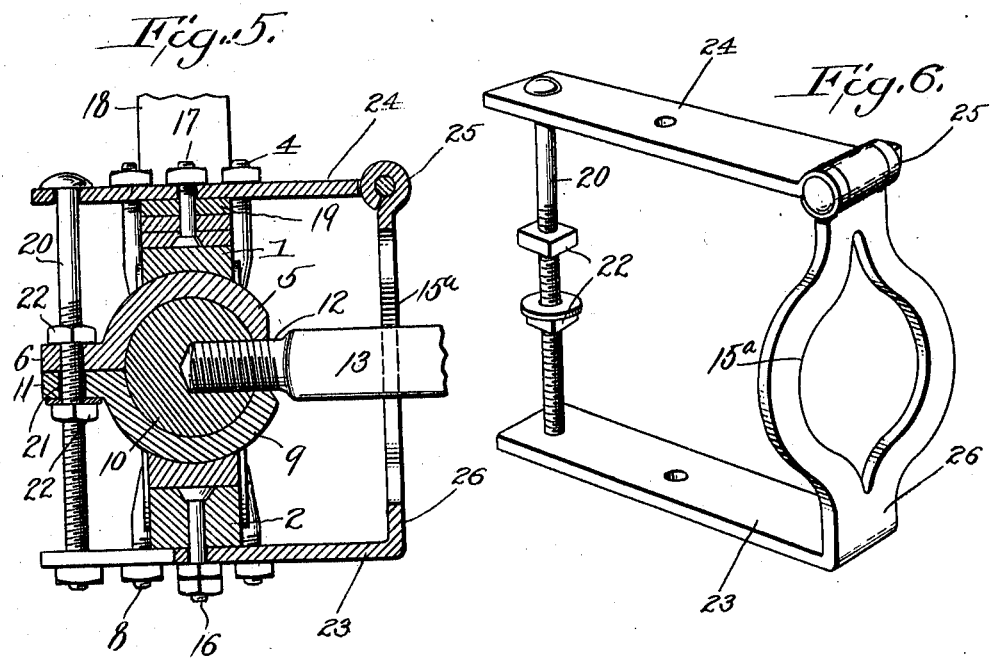
WITNESSES
INVENTOR
W. J. Martin
BY
ATTORNEY

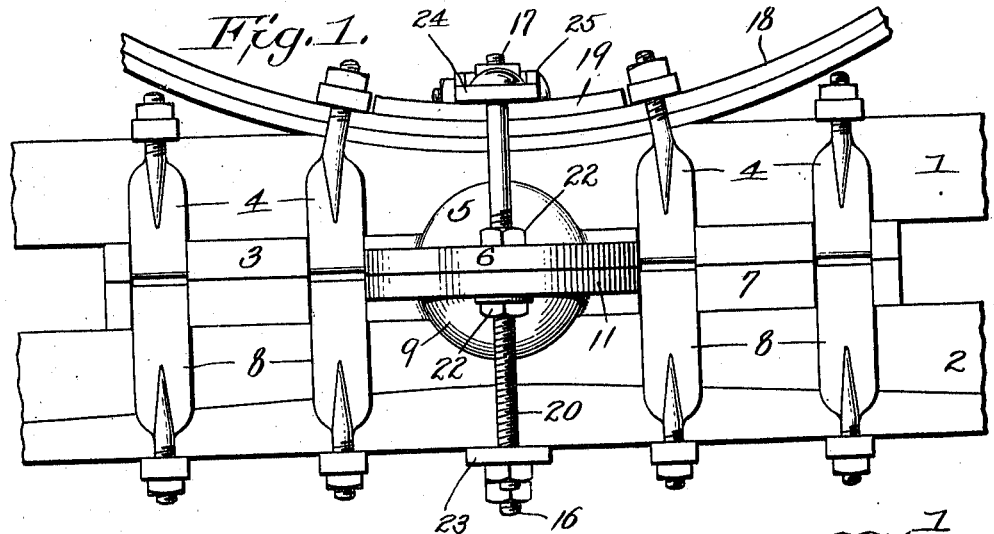
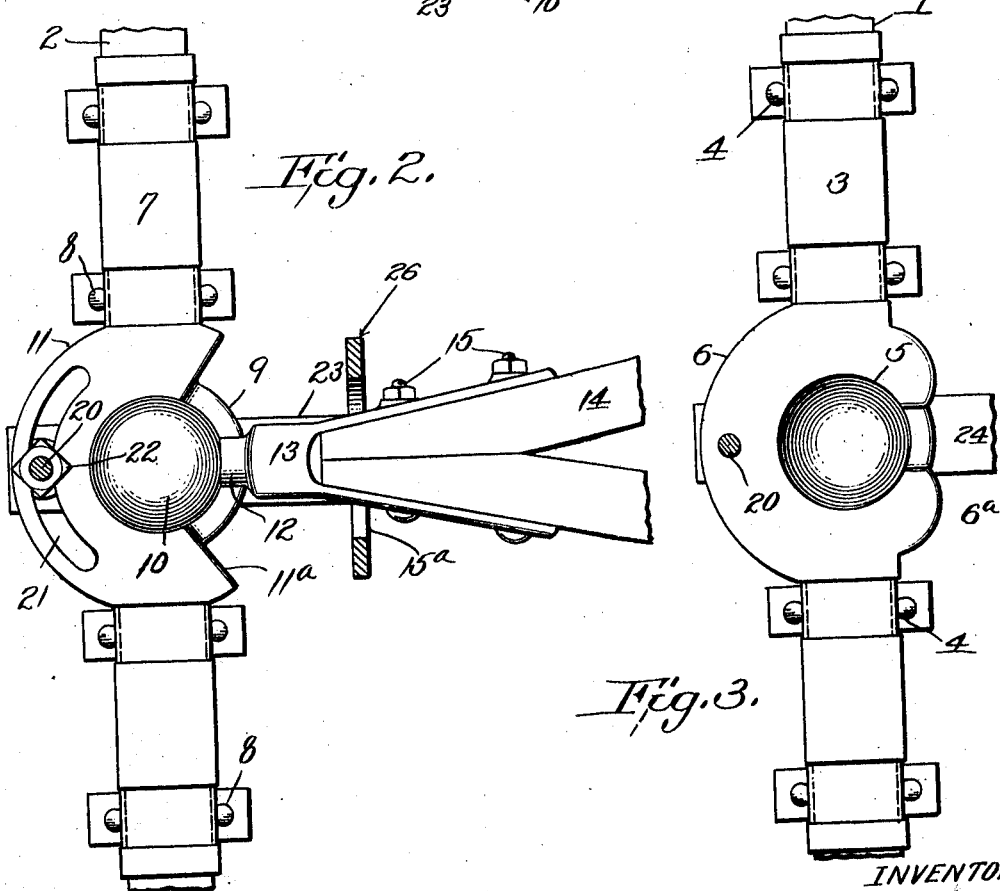
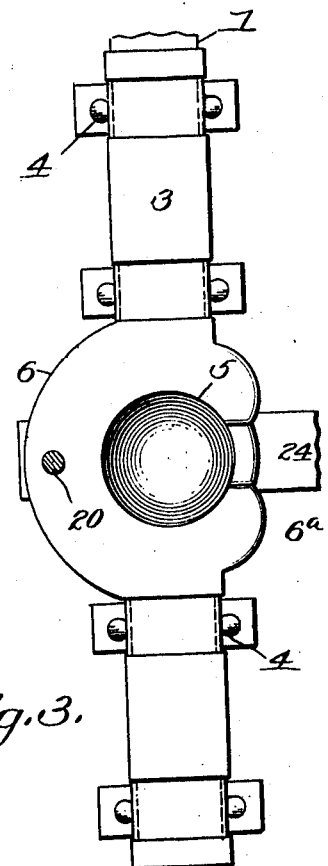

UNITED STATES PATENT OFFICE.

WILLIAM JOSEPH MARTIN, OF SAULSBURY, TENNESSEE.

FIFTH-WHEEL.

988,884.  Specification of Letters Patent.  Patented Apr. 4, 1911.

Application filed January 7, 1911. Serial No. 601,419.

*To all whom it may concern:*

Be it known that I, WILLIAM JOSEPH MARTIN, citizen of the United States, residing at Saulsbury, in the county of Hardeman and State of Tennessee, have invented certain new and useful Improvements in Fifth-Wheels, of which the following is a specification.

The present invention relates in general to vehicles, and more particularly to an improved fifth wheel embodying novel features of construction whereby the strain upon all of the parts is evenly distributed and the reach relieved of all twisting or torsional strain.

The object of the invention is the provision of a fifth wheel which is comparatively simple and inexpensive in its construction and comprises few and durable parts which can be quickly assembled or taken apart for purpose of repair.

With these and other objects in view, the invention consists in certain combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a front elevation of a fifth wheel constructed in accordance with the invention. Fig. 2 is a top plan view with the bolster and detached parts removed, portions being shown in section. Fig. 3 is a bottom plan view of the bolster member. Fig. 4 is a rear view of the fifth wheel, the reach being shown in section. Fig. 5 is a transverse sectional view through the fifth wheel, and Fig. 6 is a detached perspective view of the hinged clamping member.

Corresponding and like parts are referred to in the following description and indicated in all the views of the drawings by the same reference characters.

Referring to the drawings wherein one embodiment of the invention is illustrated, the numeral 1 designates the bolster of a vehicle, and 2 an axle member which is arranged under the bolster so as to form a support for the same, and is designed to turn laterally in the usual manner with respect thereto. The plate 3 is secured to the bottom of the bolster 1 by means of a number of U bolts 4, the plate being cut away at the bottom and edges thereof to receive the said U bolts and prevent the same from projecting outwardly beyond the plate. The central portion of this plate 3 is formed with a semispherical socket 5 the upper portion of which is embedded in the bolster, while the mouth of the socket is surrounded by an annular flange 6. A similar plate 7 is secured to the upper face of the axle member 2 by means of a series of U bolts 8, the top and sides of the plate being suitably recessed, as in the previous instance, to receive the U bolts. The central portion of this second plate 7 is formed with a semispherical socket 9 which is located opposite the socket 5 of the plate 3 and coöperates therewith to form a spherical chamber within which a ball 10 is loosely mounted. The lower portion of the socket 9 is embedded in the axle member 2, while the mouth of the said socket is surrounded by an annular flange 11 corresponding to the flange 6 of the socket 5 and frictionally engaging the same, the said flanges coöperating with each other to form bearing plates for the axle member. The meeting edges of the sockets 5 and 9 are notched at the rear thereof to receive a stem 12 which projects from the reach engaging casting 13 and is threaded in the ball 10. The reach 14 may be either straight or forked, and is shown in the present instance as secured to the casting 13 by means of the bolts 15. The rear portion of the annular flange 6 surrounding the upper socket is cut away as indicated at 6ª to receive the reach engaging casting 13, while the flange 11 surrounding the lower socket is cut away as indicated at 11ª to provide a clearance space for the stem 12 of the reach engaging casting when the axle member is turned, the cut away portion of the lower flange being considerably greater than that of the upper flange.

For the purpose of holding the members together a hinged clamp is provided, the said clamp being shown detached from the fifth wheel in Fig. 6 of the drawings. This clamp comprises a lower horizontal bar 23 and an upper horizontal bar 24, the rear end of the upper bar 24 being hinged at 25 to the upper end of a vertical plate 26 which is integral with the inner end of the lower bar 23 and projects upwardly therefrom. This plate 26 is formed with a suitable opening 15ª through which the reach extends, the central portion of the lower bar 23 being secured to the bottom of the axle member 2 by a bolt 16, while the central portion of the upper bar 24 is secured in a similar manner to the bolster by means of a bolt 17. This bolt 17 also projects through the elliptic springs 18 which rest upon the bolster, a filling plate 19 being interposed between the upper bar and the springs. The plate 26 is spaced from the rear face of the bolster, and the forward extremities of the bars 23 and 24 project beyond the bolster and axle member where they are connected by a bolt 20, the said bolt passing through an opening in the flange 6 of the upper socket 5, and also through a segmental slot 21 in the flange 11 of the lower socket 9. This segmental slot 21 permits of the usual lateral turning of the axle member, and the two flanges are held together by means of nuts 22 which are threaded upon the bolt 20 both above and below the same.

It will be obvious that the various parts of the fifth wheel are held securely together by means of the hinged clamping member, the axle member being permitted to turn freely in the usual manner, and the reach being also permitted to turn freely about a longitudinal axis. Such a construction has the advantage of distributing the strain uniformly throughout all the parts, and thereby greatly prolong the usefulness of the device. Attention is further directed to the fact that the hinged clamping member is peculiarly constructed and applied to the fifth wheel so as to be very easily and quickly removed therefrom, and after this clamping member has been detached, the various parts of the fifth wheel can be lifted apart and access freely had thereto.

Having thus described the invention, what I claim as new and desire to secure by Letters Patent, is:—

1. In a fifth wheel, the combination of a bolster, an axle member, plates applied to the adjacent faces of the bolster and axle member and formed with corresponding semispherical sockets coöperating with each other to provide a spherical chamber, the meeting faces of the sockets being provided with bearing flanges, a ball mounted within the spherical chamber, a reach engaging member connected to the ball, a U shaped clamp fitting around the bolster and axle member, and a bolt connecting the arms of the U shaped clamp and passing through the bearing flanges of the sockets, the bearing flange of the socket upon the axle member being slotted for the reception of the bolt.

2. In a fifth wheel, the combination of a bolster, an axle member, plates applied to the adjacent faces of the bolster and axle member and formed with corresponding semispherical recesses coöperating with each other to provide a spherical chamber, the meeting edges of the sockets being formed with bearing flanges, a ball loosely mounted within the spherical chamber, a reach, a reach engaging casting connected to the ball, a U shaped clamp fitted around the bolster and axle member, the base of the clamp being formed with an opening to receive the reach, and a bolt connecting the arms of the U shaped clamp, the said bolt engaging the bearing flanges of the sockets.

3. In a fifth wheel, the combination of a bolster, an axle member, plates applied to the adjacent faces of the bolster and axle member and formed with semispherical sockets coöperating with each other to provide a spherical chamber, the meeting edges of the sockets being provided with bearing flanges, a ball loosely mounted within the spherical chamber, a reach engaging member connected to the ball, a U shaped clamping member fitted removably around the bolster and axle member, one of the arms of the said U shaped clamping member being hinged, and a bolt connecting the free ends of the arms of the U shaped clamping member, the said bolt engaging the before mentioned bearing flanges of the sockets.

4. In a fifth wheel, the combination of a bolster, an axle member, plates applied to the adjacent faces of the bolster and axle member and provided with semispherical sockets coöperating with each other to provide a spherical chamber, the meeting edges of the sockets being provided with bearing flanges, a reach, a ball mounted within the spherical chamber, a reach engaging member formed with a stem which is connected to the ball, the edges of the sockets being notched to receive the stem and the bearing flanges being cut away to provide the necessary clearance space, a U shaped clamping member having one of its arms hinged to the base thereof, the said clamping member fitting around the bolster and axle member and the base of the clamp being in the nature of a plate formed with an opening loosely receiving the reach, and a bolt connecting the free ends of the arms of the clamp, the bolt passing through the bearing flanges of the sockets and the bearing flange of that socket applied to the axle member being slotted for the reception of the bolt to admit of the axle turning in the usual manner.

In testimony whereof I affix my signature in presence of two witnesses.

WILLIAM JOSEPH MARTIN.

Witnesses:
J. T. ELLIOTT,
N. O. STRUT.